United States Patent
Song et al.

(10) Patent No.: US 12,466,452 B2
(45) Date of Patent: Nov. 11, 2025

(54) AUTOMATIC PARKING METHOD AND APPARATUS, AND ELECTRONIC DEVICE AND STORAGE MEDIUM

(71) Applicant: TRAFFIC CONTROL TECHNOLOGY CO., LTD., Beijing (CN)

(72) Inventors: Xiaoyue Song, Beijing (CN); Jianzhong Ma, Beijing (CN); Diansheng Song, Beijing (CN); Yunjun Ren, Beijing (CN)

(73) Assignee: Traffic Control Technology Co., Ltd., Beijing (CN)

( * ) Notice: Subject to any disclaimer, the term of this patent is extended or adjusted under 35 U.S.C. 154(b) by 424 days.

(21) Appl. No.: 18/000,018

(22) PCT Filed: Dec. 30, 2020

(86) PCT No.: PCT/CN2020/141210
§ 371 (c)(1),
(2) Date: Nov. 28, 2022

(87) PCT Pub. No.: WO2021/238203
PCT Pub. Date: Dec. 2, 2021

(65) Prior Publication Data
US 2023/0202542 A1    Jun. 29, 2023

(30) Foreign Application Priority Data
May 27, 2020 (CN) .......................... 202010464056.8

(51) Int. Cl.
*B61L 27/04* (2006.01)
*B61L 23/14* (2006.01)

(52) U.S. Cl.
CPC ............... *B61L 27/04* (2013.01); *B61L 23/14* (2013.01)

(58) Field of Classification Search
CPC ....... B61L 23/14; B61L 27/04; B60W 60/001; B60W 60/00133; G01C 21/34; G01C 21/3617
See application file for complete search history.

(56) References Cited

U.S. PATENT DOCUMENTS 5,094,115 A * 3/1992 Michihira ............... F16H 59/08
74/335
5,565,870 A * 10/1996 Fukuhara ............... G01S 7/2926
342/72

(Continued)

FOREIGN PATENT DOCUMENTS

CN    102167065 A1    8/2011
CN    102514591 A     6/2012

(Continued)

OTHER PUBLICATIONS

Chinese First Office Action for Chinese Application No. 202010464056.8, dated Feb. 10, 2021, 16 pages with translation.

(Continued)

Primary Examiner — John Kwon
(74) Attorney, Agent, or Firm — TraskBritt

(57) ABSTRACT

A method for automatic stop comprises: acquiring a target distance correction value, wherein the target distance correction value is determined according to a historical parking error value before a target moment, and the target moment is the time when the target distance correction value is stored; correcting an acquired target distance value according to the target distance correction value, so as to obtain a corrected target distance value, wherein the target distance value is the value of the distance between the current position of a vehicle and a target parking position; and according to the corrected target distance value, executing (Continued)

the present instance of automatic parking. An automatic parking apparatus may be used to carry out such a method.

6 Claims, 4 Drawing Sheets

(56) References Cited

U.S. PATENT DOCUMENTS

| | | | |
|---|---|---|---|
| 6,037,881 A | | 3/2000 | Bornhauser et al. |
| 8,010,274 B2 * | | 8/2011 | Sawada ............... B60T 7/22 |
| | | | 701/79 |
| 2008/0033625 A1 * | | 2/2008 | Ohtsuji ............ B60W 30/16 |
| | | | 701/93 |
| 2010/0106372 A1 * | | 4/2010 | Watanabe .......... B62D 15/0285 |
| | | | 701/41 |
| 2017/0305396 A1 | | 10/2017 | Shiratsuchi |
| 2020/0011282 A1 | | 1/2020 | Wakasugi |
| 2022/0196424 A1 * | | 6/2022 | Takeuchi ........... G01C 21/3617 |

FOREIGN PATENT DOCUMENTS

| | | |
|---|---|---|
| CN | 104540719 A | 4/2015 |
| CN | 107953901 A | 4/2018 |
| CN | 109278806 A | 1/2019 |
| CN | 109501818 A | 3/2019 |
| CN | 111391895 A | 7/2020 |
| CN | 111762234 A | 10/2020 |
| JP | 2007055371 A | 3/2007 |

OTHER PUBLICATIONS

Chinese Second Office Action for Chinese Application No. 202010464056.8, dated Jun. 21, 2021, 17 pages with translation.
International Search Report for International Application No. PCT/CN2020/141210, mailed Mar. 19, 2021, 1 page.
International Written Opinion for International Application No. PCT/CN2020/141210, mailed Mar. 19, 2021, 9 pages.
European Search Report and Opinion for U.S. Appl. No. 20/937,372 dated Oct. 26, 2023, 9 pages.

* cited by examiner

AUTOMATIC PARKING METHOD AND APPARATUS, AND ELECTRONIC DEVICE AND STORAGE MEDIUM

CROSS-REFERENCE TO RELATED APPLICATIONS

This application is a national phase entry under 35 U.S.C. § 371 of International Patent Application PCT/CN2020/141210, filed Dec. 30, 2020, designating the United States of America and published as International Patent Publication WO 2021/238203 A1 on Dec. 2, 2021, which claims the benefit under Article 8 of the Patent Cooperation Treaty to Chinese Patent Application Serial No. 202010464056.8, filed May 27, 2020.

TECHNICAL FIELD

The present disclosure relates to the field of rail transit, and, in particular, to a method and an apparatus for automatic stop, an electronic device and a storage medium.

BACKGROUND

An automatic train operation (ATO) system works under a protection of an automatic train protection (ATP) system and is an automatic train control system that has functions such as automatic train operation, precise stop, automatic platform operation, unmanned return, and automatic train running adjustment.

A traditional ATO system perform automatic stop through benchmark stop. The ATO system obtains a distance between a current position of a train and a target stop point in real time, and controls a traction system and a brake system according to this distance to automatically park.

For a precise stop control function of the ATO system, operators generally require an error range of precise stop by the ATO system is within ±10 cm. However, ATO systems provided by most manufacturers only support a stop precision range within ±30 cm, or even ±50 cm for some special trains, which fails to meet requirements of the users. In order to meet requirements of the stop precision, lots of manpower are invested in research and development, design or onsite trial operation, but only the precise stop range within ±50 cm for general engineering lines is met. Meeting the precise stop range within ±10 is still a difficult problem.

BRIEF SUMMARY

Embodiments of the present disclosure provide a method and an apparatus for automatic stop, an electronic device and a storage medium to solve the above-mentioned problems in the related art.

A method for automatic stop according to an embodiment of the present disclosure, including:
obtaining a target distance correcting value, where the target distance correcting value is determined according to a historical stop error value before a target moment, and the target moment is a moment at which the target distance correcting value is stored;
correcting an obtained target distance value according to the target distance correcting value to obtain a corrected target distance value, where the target distance value is a distance value between a current position of a vehicle and a target stop position; and
performing automatic stop according to the corrected target distance value.

In an embodiment, before the obtaining the target distance correcting value, the method further includes:
obtaining the historical stop error value before the target moment, where the historical stop error value includes a stop error value corresponding to each of n stops before the target moment, and n is a natural number;
determining a target distance correcting value corresponding to each of the n stops before the target moment according to the historical stop error value;
determining the target distance correcting value according to the target distance correcting value corresponding to each of the n stops before the target moment and a stop error value of an n-th stop in the n stops before the target moment.

In an embodiment, a calculation formula for determining the target distance correcting value is as follows:

$$\text{AdjValue} = (\text{AdjValue}_1 + \text{AdjValue}_2 + \ldots + \text{AdjValue}_{n-1} + \text{AdjValue}_n + \text{stopErr}_n)/n,$$

where the AdjValue is the target distance correcting value, the $\text{AdjValue}_1$ is a target distance correcting value corresponding to a first stop in the n stops before the target moment, the $\text{AdjValue}_2$ is a target distance correcting value corresponding to a second stop in the n stops before the target moment, the $\text{AdjValue}_{(n-1)}$ is a target distance correcting value corresponding to a (n−1)th stop in the n stops before the target moment, the $\text{AdjValue}_n$ is a target distance correcting value corresponding to an n-th stop in the n stops before the target moment, and the $\text{stopErr}_n$ is a stop error value of the n-th stop in the n stops before the target moment.

In an embodiment, after performing the automatic stop, the method further includes:
in case of a stop error value of the automatic stop meets a requirement of a preset stop precision and a status identification of a current target distance correcting value is a second identification, updating the status identification of the target distance correcting value to a first identification, where the first identification is used to characterize that automatic stop using the current target distance correcting value meets the requirement of the preset stop precision, and the second identification is used to characterize that automatic stop using the current target distance correcting value does not meet the requirement of the preset stop precision.

In an embodiment, after performing the automatic stop, the method further includes:
in case of a stop error value of the automatic stop does not meet a requirement of a preset stop precision, a status identification of a current target distance correcting value is a first identification and the number of precision anomalies is less than or equal to a preset number, increasing the number of precision anomalies by one, where the first identification is used to characterize that automatic stop using the current target distance correcting value meets the requirement of the preset stop precision, and the number of precision anomalies is an accumulated number that the stop error value does not meet the preset stop precision.

In an embodiment, after performing the automatic stop, the method further includes:
in case of a stop error value of the automatic stop does not meet a requirement of a preset stop precision, a status identification of a current target distance correcting value is a first identification and the number of precision anomalies belonging to the same category is greater than a preset number, updating the status identification of the target distance correcting value to a second identification, where the first identification is used to characterize that automatic stop using the current target distance correcting value meets the requirement of the preset stop precision, and the second identification is used to characterize that automatic stop using the current target distance correcting value does not meet the requirement of the preset stop precision.

In an embodiment, after performing the automatic stop, the method further includes:

in case of a stop error value of the automatic stop does not meet a requirement of a preset stop precision and a status identification of a current target distance correcting value is a second identification, determining a new target distance correcting value according to a current historical stop error value, and storing the new target distance correcting value, where the second identification is used to characterize that automatic stop using the current target distance correcting value does not meet the requirement of the preset stop precision.

An embodiment of the present disclosure provides an apparatus for automatic stop, including:

an obtaining module, configured to obtain a target distance correcting value, where the target distance correcting value is determined according to a historical stop error value before a target moment, and the target moment is a moment at which the target distance correcting value is stored;

a correcting module, configured to correct an obtained target distance value according to the target distance correcting value to obtain a corrected target distance value, where the target distance value is a distance value between a current position of a vehicle and a target stop position; and an executing module, configured to perform automatic stop according to the corrected target distance value.

An embodiment of the present disclosure provides an electronic device, including a processor and a memory storing a computer program that is executable on the processor, the program, when executed by the processor, causes the processor to perform the steps of the above-mentioned method for automatic stop.

An embodiment of the present disclosure provides a computer-readable storage medium storing computer programs that, when executed by a processor, causes to processor to perform the steps of the above-mentioned method for automatic stop.

In the method and apparatus for automatic stop, electronic device and storage medium according to the embodiments of the present disclosure, the historical stop error value is used to correct the target distance value, and automatic stop is performed according to the corrected target distance value, which improves the precision of automatic stop.

DETAILED DESCRIPTION

Figure 1:
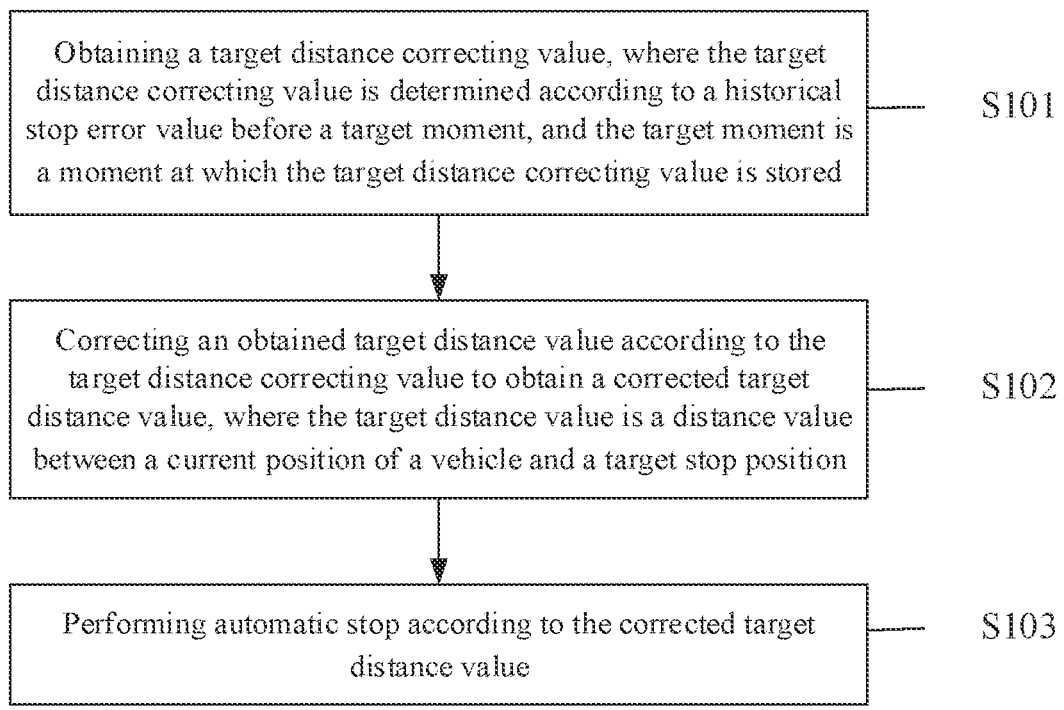
FIG. 1 is a schematic diagram of a method for automatic stop according to an embodiment of the present disclosure.

In order to illustrate the objectives, solutions and advantages of the present disclosure clearly, the solutions in the embodiments of the present disclosure will be described clearly and completely below in combination with the drawings in the embodiments of the present disclosure. The described embodiments are part of the embodiments of the present disclosure, not all embodiments. Based on the embodiments of the present disclosure, all other embodiments obtained by those of ordinary skill in the art without creative work are within the protection scope of the present disclosure.

An ATO system works under a protection of an ATP system and is an automatic train control system that has functions such as automatic train operation, precise stop, automatic platform operation, unmanned return, and automatic train running adjustment. The ATO system adopts high-reliability hardware structure and software design, applies a train dynamics model combining single-mass point and multi-mass points, and adopts a layered architecture, to realize a combination of long-period operation curve optimization and short-period real-time control, which can greatly reduce labor intensities of drivers, and ensures efficient, comfortable, punctual, precise stop, and energy-saving operation of a current urban rail transit system with high-speed and high-density. The ATO system can automatically control the train to start, cruise, and precisely stop, can automatically open and close train's doors and control a linkage between platform doors and safety doors, can automatically perform operation adjustment commands such as train skipping station, train holding, interstation operation adjustment, etc., can provide comprehensive assisted driving information for a driver, and can guide a driver to drive.

For a precise stop control function of the ATO system, operators generally require that an error range of precise stop by the ATO system is within ±10 cm. However, ATO systems provided by most manufacturers only support a stop precision range within ±30 cm, or even ±50 cm for some special trains, which fails to meet requirements of the users. In order to meet requirements of the stop precision, lots of manpower are invested in research and development, design or onsite trial operation, but only the precise stop range within ±50 cm for general engineering lines is met. Meeting the precise stop range within ±10 is still a difficult problem.

Based on past experience, with the successive operation of the lines once under construction, the way to adjust the stop accuracy of trains by manual onsite adjustment can lead to greater manpower consumption and excessive unnecessary costs, and manual adjustment has unsatisfactory efficiency and effect.

In view of the above-mentioned problems, in the embodiment of the present disclosure, a target distance during precise stop process can be automatically adjusted by software control, which solves problems of unnecessary waste of manpower and large precise stop errors.

FIG. 1 is a schematic diagram of a method for automatic stop according to an embodiment of the present disclosure. As shown in FIG. 1, the embodiment of the present disclosure provides a method for automatic stop, which is executed by an apparatus for automatic stop. The apparatus for automatic stop can be an individual device or a module in the ATO system. The method includes the following steps.

S101: obtaining a target distance correcting value, where the target distance correcting value is determined according to a historical stop error value before a target moment, and the target moment is a moment at which the target distance correcting value is stored.

In an embodiment, in the process of automatic stop, the ATO system first needs to obtain the target distance correcting value. After each stop, the ATO system can record the stop error value. The target distance correcting value is determined based on a historical stop error value before storing the target distance correcting value. The target distance correcting value is used to correct the obtained target distance value.

In an embodiment, after each stop, the target distance correcting value can be calculated according to the historical stop error value until the target distance correcting value reaches a stable status. When an automatic stop performed according to the target distance correcting value is within a preset stop precision, it can be determined that the target distance correcting value reaches a stable status. When the target distance correcting value reaches a stable status, the target distance correcting value is stored in memory.

The stop error value indicates a deviation of an actual stop position from a target stop position, where the stop error value is a positive value when the vehicle does not arrive at the stop sign, and the stop error value is a negative value when the vehicle passes the stop sign.

The target distance correcting value can be stored in a ferroelectric memory NVRAM in the ATO system, and can also be stored in an external memory of the ATO system.

S102: correcting an obtained target distance value according to the target distance correcting value to obtain a corrected target distance value, where the target distance value is a distance value between a current position of a vehicle and a target stop position.

In an embodiment, after obtaining the target distance correcting value, the ATO system corrects the obtained target distance value according to the target distance correcting value to obtain the corrected target distance value.

The target distance value is the distance value between the current position of the vehicle and the target stop position.

In an embodiment, the obtained target distance value can be corrected according to the following formula:

$$atoDtg'=atoDtg+AdjValue.$$

The atoDtg' is the corrected target distance value, the atoDtg is the target distance value, and the AdjValue is the target distance correcting value.

When the vehicle is running for the first time and no historical stop error value is available, the value of the AdjValue is a default value, which can be set according to actual situations. For example, the default value can be set to zero.

S103: performing automatic stop according to the corrected target distance value.

In an embodiment, after the target distance value is corrected, a traction system and a braking system of the vehicle can be controlled according to the corrected target distance value to perform automatic stop.

In the method for automatic stop according to the embodiment of the present disclosure, the target distance value is corrected by using the historical stop error value, and automatic stop is performed according to the corrected target distance value, which improves the precision of automatic stop.

Based on any of the above embodiments, in an embodiment, before the obtaining the target distance correcting value, the method further includes:

obtaining the historical stop error value before the target moment, where the historical stop error value includes a stop error value corresponding to each of n stops before the target moment, and n is a natural number;

determining a target distance correcting value corresponding to each of the n stops before the target moment according to the historical stop error value;

determining the target distance correcting value according to the target distance correcting value corresponding to each of the n stops before the target moment and a stop error value of an n-th stop in the n stops before the target moment.

In an embodiment of the present disclosure, the steps of determining the target distance correcting value according to the historical stop error value before the target moment are as follows.

First, the historical stop error value before the target moment is obtained. The historical stop error value includes the stop error value corresponding to each of n stops before the target moment. n is a natural number. When the vehicle is running for the first time and no historical stop error is available, that is, when n is equal to zero, the value of the historical stop error is a default value, which can be set according to actual situations. For example, the default value can be set to zero.

Then, the target distance correcting value corresponding to each of the n stops before the target moment is determined according to the historical stop error value. After each stop, the ATO system can record the stop error value and the target distance correcting value used in this stop.

Finally, the target distance correcting value is determined according to the target distance correcting value corresponding to each of the n stops before the target moment and the stop error value of the n-th stop in the n stops before the target moment.

In the method for automatic stop according to the embodiment of the present disclosure, in the process of determining the target distance correcting value, the target distance correcting value corresponding to each of the n stops before the target moment and the stop error value of the n-th stop in the n stops before the target moment are selected to determine the target distance correcting value, which makes the obtained target distance correcting value more accurate, and further improves the precision of automatic stop.

Based on any of the above embodiments, in an embodiment, a calculation formula for determining the target distance correcting value is as follows:

$$AdjValue=(AdjValue_1+AdjValue_2+ \ldots + AdjValue_{n-1}+AdjValue_n+stopErr_n)/n.$$

The AdjValue is the target distance correcting value, the $AdjValue_1$ is a target distance correcting value corresponding to a first stop in the n stops before the target moment, the $AdjValue_2$ is a target distance correcting value corresponding to a second stop in the n stops before the target moment, the $AdjValue_{(n-1)}$ is a target distance correcting value corresponding to a (n−1)-th stop in the n stops before the target moment, the $AdjValue_n$ is a target distance correcting value corresponding to an n-th stop in the n stops before the target moment, and the $stopErr_n$ is the stop error value of the n-th stop in the n stops before the target moment.

In an embodiment of the present disclosure, the calculated target distance correcting value by using the above calculation formula is more accurate.

In the method for automatic stop according to the embodiment of the present disclosure, the above-mentioned preset calculation formula is used to calculate the target distance correcting value, which can make the calculated target distance correcting value more accurate and further improves the precision of automatic stop.

Based on any of the above embodiments, in an embodiment, after performing the automatic stop, the method further includes:

in case of a stop error value of the automatic stop meets a requirement of a preset stop precision and a status identification of a current target distance correcting value is a second identification, updating the status identification of the target distance correcting value as a first identification, where the first identification is used to characterize that automatic stop using the current target distance correcting value meets the requirement of the preset stop precision, and the second identification is used to characterize that automatic stop using the current target distance correcting value does not meet the requirement of the preset stop precision.

For example, after the automatic stop is performed, the stop error value of this automatic stop can be compared with a stop precision set in advance (abbreviated as "preset stop precision") to determine whether the stop error value of this automatic stop meets the requirement of the preset stop precision.

Figure 2:
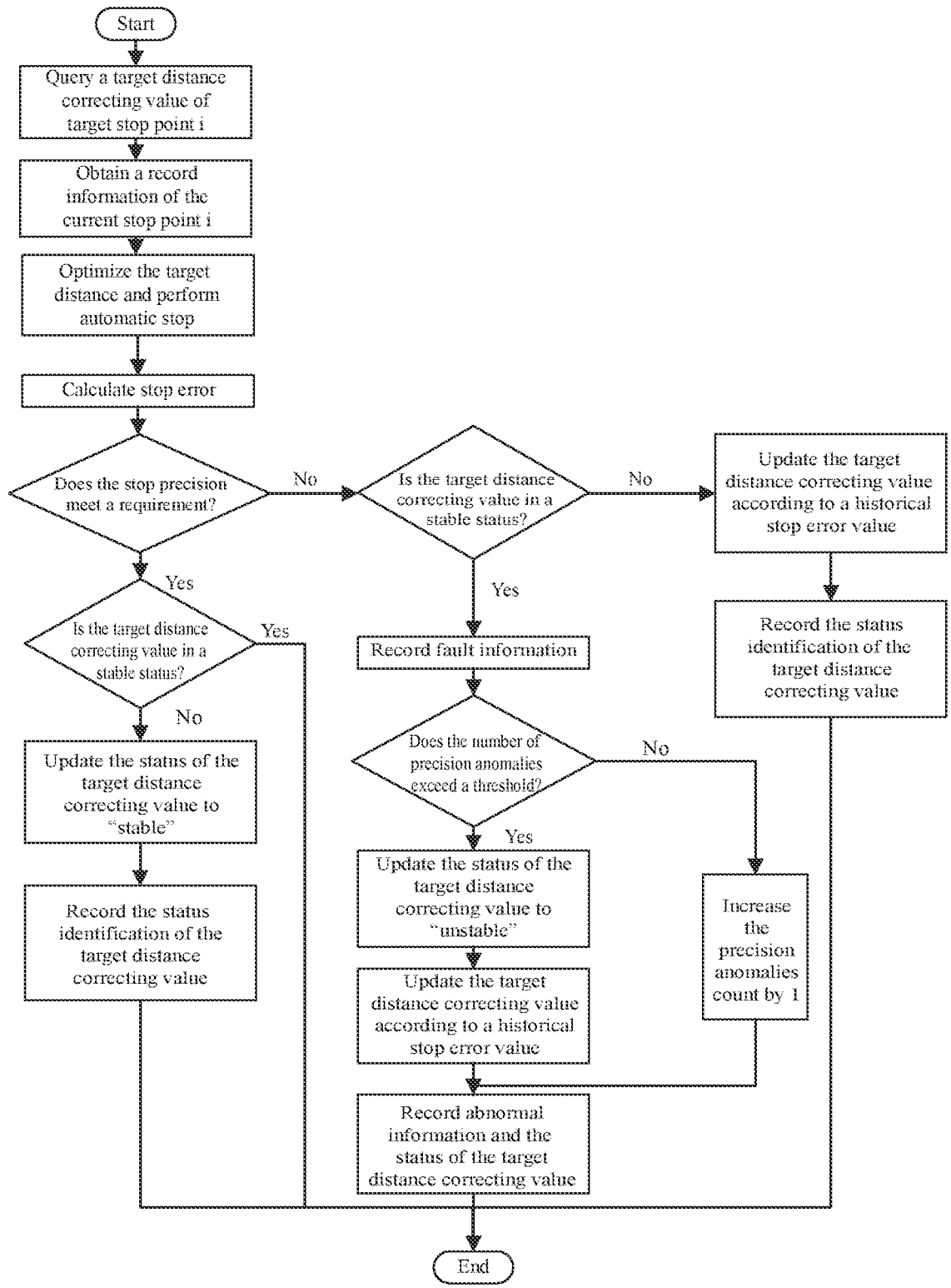
FIG. 2 is a schematic logic flow diagram of correcting a target distance value according to an embodiment of the present disclosure.

FIG. 2 is a schematic logic flow diagram of correcting a target distance value according to an embodiment of the present disclosure. As shown in FIG. 2, in case of the stop error value of the automatic stop meets the requirement of the preset stop precision, and the status identification of the current target distance correcting value is the second identification, the status identification of the target distance correcting value is updated to the first identification.

The first identification is used to characterize that the target distance correcting value is in a "stable" status, that is, automatic stop using the current target distance correcting value meets the requirement of the preset stop precision.

The second identification is used to characterize that the target distance correcting value is in an "unstable" status, that is, automatic stop using the current target distance correcting value does not meet the requirement of the preset stop precision.

In case of the stop error value of the automatic stop meets the requirement of the preset stop precision and the status identification of the current target distance correcting value is the first identification, it indicates that the target distance correcting value is in "stable" status, that is, automatic stop using the current target distance correcting value meets the requirement of the preset stop precision.

In the method for automatic stop according to the embodiment of the present disclosure, after each stop, the status of the target distance correcting value is updated according to the stop precision if it is necessary, so that the status of the target distance correcting value can be clarified in real time, which further improves the precision of automatic stop.

Based on any of the above embodiments, in an embodiment, after performing the automatic stop, the method further includes:

in case of a stop error value of the automatic stop does not meet a requirement of a preset stop precision, a status identification of a current target distance correcting value is a first identification and the number of precision anomalies is less than or equal to a preset number, increasing the number of precision anomalies by one, where the first identification is used to characterize that automatic stop using the current target distance correcting value meets the requirement of the preset stop precision, and the number of precision anomalies is an accumulated number that the stop error value does not meet the preset stop precision.

For example, after the automatic stop is performed, the stop error value of this automatic stop can be compared with the preset stop precision to determine whether the stop error value of this automatic stop meets the requirement of the preset stop precision.

FIG. 2 is a schematic logic flow diagram of correcting a target distance value according to an embodiment of the present disclosure. As shown in FIG. 2, in case of the stop error value of the automatic stop does not meet the requirement of the preset stop precision, the status identification of the current target distance correcting value is the first identification and the number of precision anomalies is less than or equal to the preset number, the number of precision anomalies is increased by one, and fault information is recorded.

The first identification is used to characterize that the target distance correcting value is in a "stable" status, that is, automatic stop using the current target distance correcting value meets the requirement of the preset stop precision.

The number of precision anomalies is an accumulated number that the stop error value does not meet the preset stop precision.

Since the stop precision may not meet the requirement even when the target distance correcting value is in the "stable" status, whether the status of the target distance correcting value needs to be adjusted can be determined in time through the number of precision anomalies.

In the method for automatic stop according to the embodiment of the present disclosure, whether the status of the target distance correcting value needs to be adjusted can be determined in time after each stop through the number of precision abnormalities, the status of the target distance correcting value can be updated when it is necessary, and the status of the target distance correcting value can be clarified in real time, which further improves the precision of automatic stop.

Based on any of the above embodiments, in an embodiment, after performing the automatic stop, the method further includes:

in case of a stop error value of the automatic stop does not meet a requirement of a preset stop precision, a status identification of a current target distance correcting value is a first identification and the number of precision anomalies belonging to the same category is greater than a preset number, updating the status identification of the target distance correcting value to a second identification, where the first identification is used to characterize that automatic stop using the current target distance correcting value meets the requirement of the preset stop precision, and the second identification is used to characterize that automatic stop using the current target distance correcting value does not meet the requirement of the preset stop precision.

For example, after the automatic stop is performed, the stop error value of this automatic stop can be compared with the preset stop precision to determine whether the stop error value of this automatic stop meets the requirement of the preset stop precision.

FIG. 2 is a schematic logic flow diagram of correcting a target distance value according to an embodiment of the present disclosure. As shown in FIG. 2, in case of the stop error value of the automatic stop does not meet the requirement of the preset stop precision, the status identification of the current target distance correcting value is the first identification and the number of precision anomalies belonging to the same category is greater than the preset number, the status identification of the target distance correcting value is updated to the second identification. The types of the precision anomalies include the situations of the vehicle does not arrive at the stop sign and the vehicle passes the stop sign.

The first identification is used to characterize that the target distance correcting value is in a "stable" status, that is, automatic stop using the current target distance correcting value meets the requirement of the preset stop precision.

The second identification is used to characterize that the target distance correcting value is in an "unstable" status, that is, automatic stop using the current target distance correcting value does not meet the requirement of the preset stop precision.

Then, a new target distance correcting value is determined according to the current historical stop error value. The method of determining the new target distance correcting value according to the current historical stop error value is the same as the above embodiments, and will not be described here.

In the method for automatic stop according to the embodiment of the present disclosure, whether the status of the target distance correcting value needs to be adjusted can be determined in time after each stop through the number of precision abnormalities, and the status of the target distance correcting value can be updated when the number of precision abnormalities is greater than the preset number, so that the status of the target distance correcting value can be clarified in real time, which further improves the precision of automatic stop.

Based on any of the above embodiments, in an embodiment, after performing the automatic stop, the method further includes:

in case of a stop error value of the automatic stop does not meet a requirement of a preset stop precision and a status identification of a current target distance correcting value is a second identification, determining a new target distance correcting value according to a current historical stop error value, and storing the new target distance correcting value, where the second identification is used to characterize that automatic stop using the current target distance correcting value does not meet the requirement of the preset stop precision.

For example, after the automatic stop is performed, the stop error value of this automatic stop can be compared with the preset stop precision to determine whether the stop error value of this automatic stop meets the requirement of the preset stop precision.

FIG. 2 is a schematic logic flow diagram of correcting a target distance value according to an embodiment of the present disclosure. As shown in FIG. 2, in case of the stop error value of the automatic stop does not meet the requirement of the preset stop precision and the status identification of the current target distance correcting value is the second identification, a new target distance correcting value is determined according to a current historical stop error value, and the new target distance correcting value is stored.

The second identification is used to characterize that the target distance correcting value is in an "unstable" status, that is, automatic stop using the current target distance correcting value does not meet the requirement of the preset stop precision.

In the method for automatic stop according to the embodiment of the present disclosure, after each stop, whether the status of the target distance correcting value is stable is determined, the new target distance correcting value is determined according to the historical stop error value when the status of the target distance correcting value is unstable, which further improves the precision of automatic stop.

The following will describe the above methods by providing a communication controller (CCOV) for the ATO system as an example.

Considering an existing actual application scenario, if the maximum number of stop points supported by a route design is 1000 and each stop point needs 2 bytes to be stored on an ATO system hardware, a storage capacity required by the ATO system for storing the target distance correcting value is about 2000 bytes. A capacity of a NVRAM of the ATO system is 32 k, and all target distance correcting values of a whole line can be written into NVRAM for storage and backup. Since the amount of data during calculating the target distance correcting values is large and the NVRAM of the ATO system has flush limitations and memory limitations, a CCOV is provided outside the ATO system. The CCOV is used to store the process data of calculating the target distance correcting value of each stop point. The CCOV has an external memory card, which can store a large amount of data.

The process data of calculating the target distance correcting value includes: an ID of a current stop point, a target distance correcting value, a status identification of the target distance correcting value, and stop precision abnormality information, etc.

When a target distance correcting value (AdjValue) corresponding to a stop point is stable, the target distance correcting value (AdjValue) corresponding to this stop point is written into the NVRAM for recording. The NVRAM is written one time when the data is stable, and the data can be directly read when the ATO system is powered on next time. When the ATO system has not reached a design requirement of the stop precision at a stop point, a current stop error at this stop point and a newly calculated target distance correcting value are transmitted to the CCOV, which can be recorded by the CCOV. The ATO system transmits an obtaining command for obtaining the corresponding target distance correcting value (such as the historical error value) to CCOPV according to the ID of the target stop point, obtains historical error record of the stop point that is not stable, and performs precise stop on this basis until the target distance correcting values of all stop points are calculated and stabilized, and the ATO system can record them all in the NVRAM.

When the ATO system operates for a first time and without the target distance correcting value, the ATO system sets the target distance correcting value of all stop points on a current project line as a default value (AdjDefault). Under the ATO system control operation, the ATO system transmits the ID of target stop point to the CCOV, the CCOV obtains the target distance correcting value matching with the ID of the target stop point and then sends it to the ATO system, the ATO system calculates a corrected target distance based on the target distance correcting value matching with the ID of the target stop point and performs precise stop by using the target distance, and the stop error (stopErr) corresponding to the ID of the target stop point is recorded again. If stopErr does not meet the design requirement of the stop precision, the status identification of the target distance correcting value corresponding to the ID of the target stop point is set as "unstable status." The ATO system can transmit the target distance correcting value corresponding to the ID of this stop point and the status identification of the target distance correcting value to the CCOV, and the CCOV records it in a local storage.

In normal scenarios, after the ID of stop point has been adjusted through multiple operations, stopErr can meet the design requirement of the stop precision, and then the status of the target distance correcting value corresponding to the ID of the stop point is identified as "stable status," and a stable target distance correcting value is recorded in the NVRAM. Similarly, the CCOV also records the stable target distance correcting value and status identification to the local storage. When stopping at the same stop point later, the stable target distance correcting value is directly used for adjustment, to make the stop precision meet the design requirement.

When the target distance correcting value (AdjValue) is calculated, a fluctuation of the stop error (stopErr), where the vehicle may not arrive at the stop sign or the vehicle may pass the stop sign, is taken into consideration. When adjusting, it is not appropriate to directly adjust the target distance according to a current distance between the vehicle and the stop sign, where the vehicle may not arrive at the stop sign or the vehicle may pass the stop sign, and the error should be gradually adjusted to be within the design requirement in a weighted form.

If a stop point k with a stable target distance correcting value has a precision abnormality in actual operation process, that is, the error is not within the design requirement of the stop precision, the stop point k should be performed on abnormal stop signing, and abnormal stop counting and abnormal type (whether the vehicle does not arrive at the stop sign or the vehicle have passed the stop sign) are recorded too. If the consecutive number N (which is configurable data, for example, it can be configured as 2) of stop precision anomalies belonging to the same category is reached at the stop point k, the status identification of the stop point k is set to "unstable status," and the target distance correcting value is adjusted until it is in a stable status. If consecutive N stop precision anomalies at the stop point k are not the same type of abnormality, or the stop precision is recovered at the stop point k when the number of stop precision anomalies has not reached N, the abnormal stop counting is cleared, and it can be determined that the N stop precision anomalies is probably caused by a traction braking response problem of the vehicle, and the existing target distance correcting value should be maintained.

When the target distance correcting value record cannot be obtained from the CCOV due to communication failure, a stable target distance correcting value record can be obtained from the NVRAM. If it is failed to obtain the target distance correcting value record due to reading the NVRAM, the ATO system uses a configured default value of the target distance correcting value, and reports the status of the ATO at the corresponding target distance correcting value.

Since an external storage unit is provided for the ATO system and the reliability of reading and writing data must be ensured, a request command secondary confirmation is used to ensure the timeliness and correctness of application messages.

Figure 3:
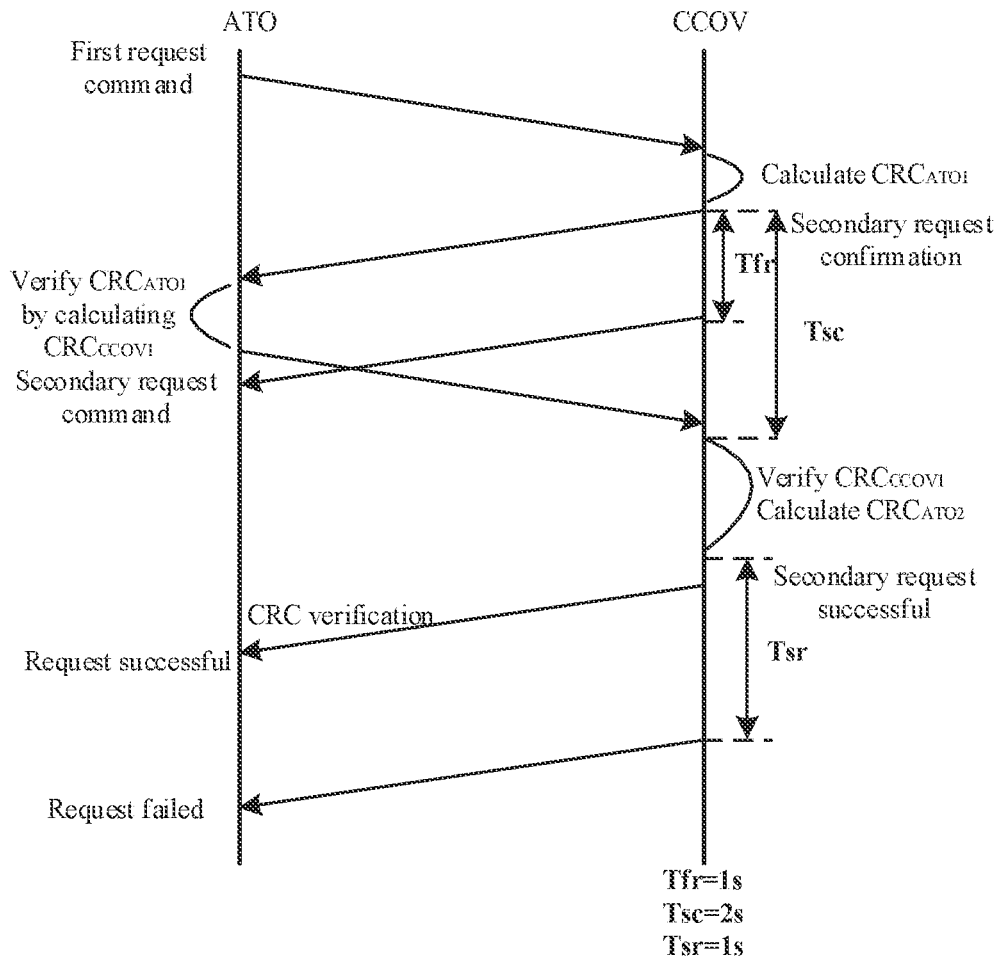
FIG. 3 shows a schematic interaction process of request command secondary confirmation according to an embodiment of the present disclosure.

FIG. 3 shows a schematic interaction process of request command secondary confirmation according to an embodiment of the present disclosure. As shown in FIG. 3, the ATO system communicates with the CCOV in a message-triggered manner. Both the ATO system and the CCOV perform data transmission in a big-endian byte order, and both the ATO system and the CCOV perform determination and logical calculation on received application information. The ATO system and the CCOV can directly discard received application information that is repeated and reversed, and determine that no application information has been received from the other party in this period. Request command secondary confirmation is used between the ATO system and the CCOV to ensure the timeliness and correctness of the application information.

In an embodiment, the communication mode for the request command secondary confirmation is as follows. For the ATO system, the ATO system triggers a first request message to the CCOV according to an updated status and a completed stop status of the target stop point. After Tfr time, if a confirmation message corresponding to the first request message replied by the CCOV is not received, it is determined that this operation fails due to communication timeout, and the ATO system needs to request again. Within Tfr time, if a first confirmation message from CCOV is received, depending on a result of OP_Status: if OP_Status is not successful, it is determined that this setting has failed, this process can be ended directly, and a new request is required; or if a response characterizes that the request was successful, the same request is sent for a second time. A second confirmation from CCOV is received within Tsr time, and if the received confirmation message characterizes that the request was successful, it is determined successful, otherwise it is determined failed, and if the received confirmation message characterizes that the request is unsuccessful, the reason for the request failure is reported, and the process is ended. If the second confirmation is not received after the Tsr times out, the receiving second confirmation being timeout is reported, and the process is ended.

For the CCOV, after receiving the request sent by the ATO system for the first time, it can reply a confirmation message in time to confirm that the first request message is received, and the confirmation message can be transmitted continuously for Tfr time. Within the Tfr time, if the CCOV receives multiple first requests from the ATO system, only the first one among the multiple first requests is determined valid. If a secondary request is not received within a Tsc time, this interaction process is ended. After receiving the secondary request, CCOV determines that this command is valid, executes it immediately, and replies second confirmation message to the ATO system. If the CCOV received multiple secondary request from the ATO system, only the first one among the multiple secondary request is determined valid. If there are CRC verification failures or other situations where commands cannot be executed, the CCOV can reply the second confirmation message within the Tsr time, and does not respond to new first and second request commands. After the Tsr time is up, the CCOV ends this request process and waits for the next security request process initiated by the ATO system.

$CRC_{ATO1}$=CRC (a timestamp of the first request command+a type of the first request command), $CRC_{CCOV1}$=CRC (a timestamp of the first confirmation+the type of the first request command), and $CRC_{ATO2}$=CRC (a timestamp of the first request+a timestamp of the second request+a type of the secondary request command).

Due to the full use of running data of the vehicle test run in a real line, the error of the precise stop can quickly and effectively meet the stop precision requirement of the operator through the calculation of the software, which can even meet a high precision of within ±10 cm. In the actual operation process, a stop scenario with precision anomalies can be sensed, and the target distance correcting value can be adjusted online, which improves the execution efficiency of the ATO system control, greatly reduces the manpower consumption when manual adjustment before opening and pressures of after-sales analysis and solution of stop precision anomalies in the online operation stage.

Figure 4:
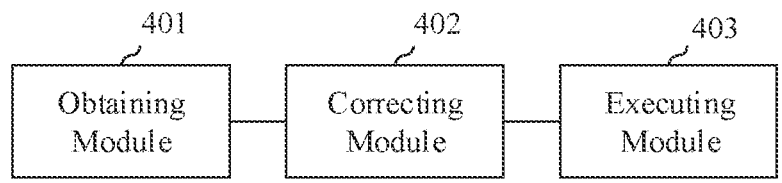
FIG. 4 is a schematic diagram of an apparatus for automatic stop according to an embodiment of the present disclosure.

Based on any of the above embodiments, FIG. 4 is a schematic diagram of an apparatus for automatic stop according to an embodiment of the present disclosure. As shown in FIG. 4, the embodiment of the present disclosure provides an apparatus for automatic stop, including an obtaining module 401, a correcting module 402 and an executing module 403.

The obtaining module 401 is configured to obtain a target distance correcting value, where the target distance correcting value is determined according to a historical stop error value before a target moment, and the target moment is a moment at which the target distance correcting value is stored. The correcting module 402 is configured to correct an obtained target distance value according to the target distance correcting value to obtain a corrected target distance value, where the target distance value is a distance value between a current position of a vehicle and a target stop position. The executing module 403 is configured to perform automatic stop according to the corrected target distance value.

The apparatus for automatic stop according to the embodiment of the present disclosure is used to execute the method described in any of the above-mentioned embodiments. The steps of performing the method described in one of the above-mentioned embodiments through the apparatus provided in this embodiment are the same as the above-mentioned corresponding implementation, which will not be described here.

In the apparatus for automatic stop according to the embodiment of the present disclosure, the historical stop error value is used to correct the target distance value, and automatic stop is performed according to the corrected target distance value, which improves the precision of automatic stop.

Figure 5:
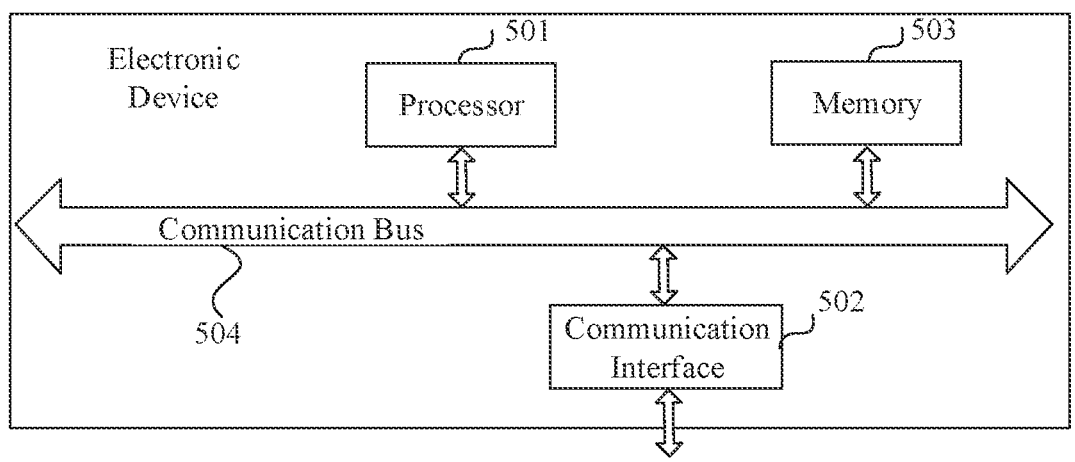
FIG. 5 is a schematic structural diagram of an electronic device according to an embodiment of the present disclosure.

FIG. 5 is a schematic structural diagram of an electronic device according to an embodiment of the present disclosure. As shown in FIG. 5, the electronic device includes: a processor 501, a communication interface 502, a memory 503, and a communication bus 504. The processor 501, the communication interface 502, and the memory 503 communicate with each other through the communication bus 504. The processor 501 can call a computer program stored on the memory 503 and executable on the processor 501 to perform the following steps:

obtaining a target distance correcting value, where the target distance correcting value is determined according to a historical stop error value before a target moment, and the target moment is a moment at which the target distance correcting value is stored;

correcting an obtained target distance value according to the target distance correcting value to obtain a corrected target distance value, where the target distance value is a distance value between a current position of a vehicle and a target stop position; and performing automatic stop according to the corrected target distance value.

In addition, the above-mentioned logic instructions in the memory 503 can be realized in the form of software function units and be stored in a computer-readable storage medium when sold or used as an individual product. Based on this understanding, the solutions of the present disclosure in essential or the part of the solutions that contributes to the related art or the part of the solutions can be embodied in the form of a software product, and the computer software product is stored in a storage medium, including several instructions, which are used to make a computer device (which can be a personal computer, a server, or a network device and the like) execute all or part of the steps of the methods described in the various embodiments of the present disclosure. The aforementioned storage media include: USB flash disk, mobile hard disk, read-only memory (ROM), random access memory (RAM), magnetic disk or optical disk, and other media that can store program codes.

In an embodiment, an embodiment of the present disclosure provides a non-volatile computer-readable storage medium storing computer programs that, when executed by a processor, causes to processor to perform the steps of the above-mentioned method embodiments. For example, the method includes:

obtaining a target distance correcting value, where the target distance correcting value is determined according to a historical stop error value before a target moment, and the target moment is a moment at which the target distance correcting value is stored;

correcting an obtained target distance value according to the target distance correcting value to obtain a corrected target distance value, where the target distance value is a distance value between a current position of a vehicle and a target stop position; and performing automatic stop according to the corrected target distance value.

The device embodiments described above are merely illustrative, the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those of ordinary skill in the art can understand and implement the solution described above without paying creative works.

Through the description of the embodiments above, those skilled in the art can clearly understand that the various embodiments can be implemented by means of software and a necessary general hardware platform, or by hardware. Based on such understanding, the above solutions of the present disclosure in essence or a part of the solutions that contributes to the related art can be embodied in the form of a software product, which can be stored in a storage medium such as ROM/RAM, magnetic disk, compact disk and the like, and includes several instructions to cause a computer device (which can be a personal computer, server, network device and the like) to perform the methods described in various embodiments or a part thereof.

Finally, it should be noted that the above embodiments are only used to explain the solutions of the present disclosure, and are not limited to them. Although the present disclosure has been described in detail with reference to the foregoing embodiments, it should be understood by those skilled in the art that they can still modify the solutions documented in the foregoing embodiments and make equivalent substitutions to a part of the features; these modifications and substitutions do not make the essence of the corresponding solutions depart from the scope of the solutions of various embodiments of the present disclosure.

The invention claimed is:

1. A method for automatic stop, comprising:
obtaining a target distance correcting value, wherein the target distance correcting value is determined according to a historical stop error value before a target moment, and the target moment is a moment at which the target distance correcting value is stored;

correcting an obtained target distance value according to the target distance correcting value to obtain a corrected target distance value, wherein the target distance value is a distance value between a current position of a vehicle and a target stop position; and performing automatic stop according to the corrected target distance value, wherein after performing the automatic stop, the method further comprises:

in case of a stop error value of the automatic stop meets a requirement of a preset stop precision and a status identification of a current target distance correcting value is a second identification, updating the status identification of the target distance correcting value to a first identification, wherein the first identification is used to characterize that automatic stop using the current target distance correcting value meets the requirement of the preset stop precision, and the second identification is used to characterize that automatic stop using the current target distance correcting value does not meet the requirement of the preset stop precision; or wherein after performing the automatic stop, the method further comprises:

in case of a stop error value of the automatic stop does not meet a requirement of a preset stop precision, a status identification of a current target distance correcting value is a first identification and the number of precision anomalies is less than or equal to a preset number, increasing the number of precision anomalies by one, wherein the first identification is used to characterize that automatic stop using the current target distance correcting value meets the requirement of the preset stop precision, and the number of precision anomalies is an accumulated number that the stop error value does not meet the preset stop precision; or wherein after performing the automatic stop, the method further comprises:

in case of a stop error value of the automatic stop does not meet a requirement of a preset stop precision, a status identification of a current target distance correcting value is a first identification and the number of precision anomalies belonging to the same category is greater than a preset number, updating the status identification of the target distance correcting value to a second identification, wherein the first identification is used to characterize that automatic stop using the current target distance correcting value meets the requirement of the preset stop precision, and the second identification is used to characterize that automatic stop using the current target distance correcting value does not meet the requirement of the preset stop precision; or wherein after performing the automatic stop, the method further comprises:

in case of a stop error value of the automatic stop does not meet a requirement of a preset stop precision and a status identification of a current target distance correcting value is a second identification, determining a new target distance correcting value according to a current historical stop error value, and storing the new target distance correcting value, wherein the second identification is used to characterize that automatic stop using the current target distance correcting value does not meet the requirement of the preset stop precision.

2. The method according to claim 1, further comprising:

obtaining the historical stop error value before the target moment, wherein the historical stop error value comprises a stop error value corresponding to each of stops before the target moment, and n is a natural number;

determining a target distance correcting value corresponding to each of the n stops before the target moment according to the historical stop error value; and determining the target distance correcting value according to the target distance correcting value corresponding to each of the n stops before the target moment and a stop error value of an n-th stop in the n stops before the target moment.

3. The method according to claim 2, wherein a calculation formula for determining the target distance correcting value is as follows:

$$\text{AdjValue} = (\text{AdjValue}_1 + \text{AdjValue}_2 + \ldots + \text{AdjValue}_{n-1} + \text{AdjValue}_n + \text{stopErr}_n)/n,$$

wherein the AdjValue is the target distance correcting value, the $\text{AdjValue}_1$ is a target distance correcting value corresponding to a first stop in the stops before the target moment, the $\text{AdjValue}_2$ is a target distance correcting value corresponding to a second stop in the stops before the target moment, the $\text{AdjValue}_{n-1}$ is a target distance correcting value corresponding to a (n−1)-th stop in the stops before the target moment, the $\text{AdjValue}_n$ is a target distance correcting value corresponding to an n-th stop in the stops before the target moment, and the $\text{stopErr}_n$ is a stop error value of the n-th stop in the n stops before the target moment.

4. An apparatus for automatic stop, comprising:

an obtaining module, configured to obtain a target distance correcting value, wherein the target distance correcting value is determined according to a historical stop error value before a target moment, and the target moment is a moment at which the target distance correcting value is stored;

a correcting module, configured to correct an obtained target distance value according to the target distance correcting value to obtain a corrected target distance value, wherein the target distance value is a distance value between a current position of a vehicle and a target stop position; and an executing module, configured to perform automatic stop according to the corrected target distance value, wherein the executing module is further configured to:

in case of a stop error value of the automatic stop meets a requirement of a preset stop precision and a status identification of a current target distance correcting value is a second identification, updating the status identification of the target distance correcting value to a first identification, wherein the first identification is used to characterize that automatic stop using the current target distance correcting value meets the requirement of the preset stop precision, and the second identification is used to characterize that automatic stop using the current target distance correcting value does not meet the requirement of the preset stop precision; or in case of a stop error value of the automatic stop does not meet a requirement of a preset stop precision, a status identification of a current target distance correcting value is a first identification and the number of precision anomalies is less than or equal to a preset number, increasing the number of precision anomalies by one, wherein the first identification is used to characterize that automatic stop using the current target distance correcting value meets the requirement of the preset stop precision, and the number of precision anomalies is an accumulated number that the stop error value does not meet the preset stop precision; or in case of a stop error value of the automatic stop does not meet a requirement of a preset stop precision, a status identification of a current target distance correcting value is a first identification and the number of precision anomalies belonging to the same category is greater than a preset number, updating the status identification of the target distance correcting value to a second identification, wherein the first identification is used to characterize that automatic stop using the current target distance correcting value meets the requirement of the preset stop precision, and the second identification is used to characterize that automatic stop using the current target distance correcting value does not meet the requirement of the preset stop precision; or in case of a stop error value of the automatic stop does not meet a requirement of a preset stop precision and a status identification of a current target distance correcting value is a second identification, determining a new target distance correcting value according to a current historical stop error value, and storing the new target distance correcting value, wherein the second identification is used to characterize that automatic stop using the current target distance correcting value does not meet the requirement of the preset stop precision.

5. An electronic device, comprising a processor and a memory storing a computer program that is executable on the processor, wherein the program, when executed by the processor, causes the processor to perform the steps of the method for automatic stop according to claim 1.

6. A computer-readable storage medium storing computer programs that, when executed by a processor, causes the processor to perform the steps of the method for automatic stop according to claim 1.

* * * * *